United States Patent
Kawai

(10) Patent No.: US 10,093,795 B2
(45) Date of Patent: Oct. 9, 2018

(54) RESIN COMPOSITION, MULTILAYER SHEET, PACKAGING MATERIAL AND CONTAINER

(71) Applicant: KURARAY CO., LTD., Kurashiki-shi (JP)

(72) Inventor: Hiroshi Kawai, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 242 days.

(21) Appl. No.: 15/026,673

(22) PCT Filed: Oct. 2, 2014

(86) PCT No.: PCT/JP2014/076441
§ 371 (c)(1),
(2) Date: Apr. 1, 2016

(87) PCT Pub. No.: WO2015/050223
PCT Pub. Date: Apr. 9, 2015

(65) Prior Publication Data
US 2016/0244601 A1 Aug. 25, 2016

(30) Foreign Application Priority Data

Oct. 2, 2013 (JP) .................. 2013-207781
Oct. 2, 2013 (JP) .................. 2013-207782

(51) Int. Cl.
| | | |
|---|---|---|
| C08L 29/02 | (2006.01) |
| B32B 27/30 | (2006.01) |
| B65D 65/38 | (2006.01) |
| B32B 27/18 | (2006.01) |
| B29C 51/10 | (2006.01) |
| B29C 51/14 | (2006.01) |
| C08L 29/04 | (2006.01) |
| B32B 27/06 | (2006.01) |
| B32B 27/28 | (2006.01) |
| B29C 47/00 | (2006.01) |
| B29C 47/06 | (2006.01) |
| B29C 47/60 | (2006.01) |
| B29C 47/92 | (2006.01) |
| B32B 27/08 | (2006.01) |
| C08L 23/16 | (2006.01) |

(52) U.S. Cl.
CPC .......... *C08L 29/02* (2013.01); *B29C 47/0021* (2013.01); *B29C 47/065* (2013.01); *B29C 47/6087* (2013.01); *B29C 47/92* (2013.01); *B29C 51/10* (2013.01); *B29C 51/14* (2013.01); *B32B 27/06* (2013.01); *B32B 27/08* (2013.01); *B32B 27/18* (2013.01); *B32B 27/288* (2013.01); *B32B 27/306* (2013.01); *B65D 65/38* (2013.01); *C08L 23/16* (2013.01); *C08L 29/04* (2013.01); *B29C 2947/92704* (2013.01); *B32B 2270/00* (2013.01); *B32B 2307/54* (2013.01); *B32B 2439/70* (2013.01); *C08L 2205/025* (2013.01)

(58) Field of Classification Search
CPC .................. C08K 5/07; C08L 29/04
See application file for complete search history.

(56) References Cited

U.S. PATENT DOCUMENTS

2004/0013893 A1 1/2004 Nakaya et al.
2007/0196679 A1 8/2007 Moriyama et al.

FOREIGN PATENT DOCUMENTS

| CN | 1649956 A | 8/2005 |
|---|---|---|
| EP | 1 479 725 A1 | 11/2004 |
| EP | 2 286 658 A2 | 2/2011 |
| JP | 5-179001 A | 7/1993 |
| JP | 8-239528 A | 9/1996 |
| JP | 9-71620 A | 3/1997 |
| JP | 11-140136 A | 5/1999 |
| JP | 2000-212369 A | 8/2000 |
| JP | 2001-31821 A | 2/2001 |
| JP | 2004-43022 A | 2/2004 |
| JP | 2005-41993 A | 2/2005 |
| JP | 2006-124668 A | 5/2006 |
| WO | WO 03/072653 A1 | 9/2003 |
| WO | 2005/014716 A1 | 2/2005 |
| WO | 2013/187455 A1 | 12/2013 |

OTHER PUBLICATIONS

International Search Report dated Dec. 16, 2014 in PCT/JP2014/076441 filed Oct. 2, 2014.

*Primary Examiner* — Wenwen Cai
(74) *Attorney, Agent, or Firm* — Oblon, McClelland, Maier & Neustadt, L.L.P.

(57) ABSTRACT

A resin composition includes an ethylene-vinyl alcohol copolymer (EVOH) (A) having an ethylene content of 20 to 50 mol %, an EVOH (B) having an ethylene content of 30 to 60 mol %, and a saturated carbonyl compound (C) having 3 to 8 carbon. The saturated carbonyl compound (C) is a saturated aldehyde, a saturated ketone, or a combination thereof. A value obtained by subtracting the ethylene content of the EVOH (A) from the ethylene content of the EVOH (B) is 8 mol % or greater. The mass ratio (A/B) of the EVOH (A) to the EVOH (B) is 60/40 to 95/5. The content of the saturated carbonyl compound (C) with respect to the resin content is 0.01 ppm or greater and less than 100 ppm.

9 Claims, No Drawings

RESIN COMPOSITION, MULTILAYER SHEET, PACKAGING MATERIAL AND CONTAINER

TECHNICAL FIELD

The present invention relates to a resin composition, a multilayer sheet, a packaging material and a container.

BACKGROUND ART

Ethylene-vinyl alcohol copolymers (hereinafter, may be abbreviated as "EVOH(s)") are useful polymeric materials that are superior in barrier properties against various types of gases such as oxygen, oil resistance, antistatic properties, mechanical strength and the like; therefore, EVOHs are formed into films, sheets, and the like, which are widely used as various types of packaging materials, containers, etc. However, the EVOH has a large number of hydroxyl groups in its molecule, and has high crystallinity, a great velocity of crystallization and poor flexibility. Therefore, the EVOH has disadvantages that: the EVOH exhibits poor suitability for secondary processing, in particular, heat stretching properties when being formed into packaging materials for foods and the like, leading to the generation of cracks in the forming, and in turn, to a decrease of a process yield of products; and a reduction of mechanical strength, deterioration of gas barrier properties, etc. occur due to a thickness unevenness, leading to lack of quality stability.

In order to improve the suitability for secondary processing, blending various types of elastomers such as an ethylene-vinyl acetate copolymer (EVA) into the EVOH has been proposed. However, these elastomers have a disadvantage that they have poor compatibility with the EVOH and therefore the resulting composition may have reduced transparency.

In view of such drawbacks, as a method for improving the transparency while ensuring the suitability for secondary processing, a process including blending EVOHs each having a different ethylene content has been developed. Specifically studied examples include: a resin composition that contains two types of saponified ethylene-vinyl acetate copolymers, one having a degree of saponification of 95 mol % or more and the other having a degree of saponification of 70 mol % or more, and a polyamide in which a terminal carboxyl group is adjusted (see Japanese Unexamined Patent Application, Publication No. H8-239528); a resin composition that contains EVOH having a degree of saponification of 98 mol % or more, and EVOH having a reduced degree of saponification through reacetylation (see Japanese Unexamined Patent Application, Publication No. 2000-212369); and a resin composition that contains three types of EVOHs each having a different ethylene content (see Japanese Unexamined Patent Application, Publication No. 2001-31821).

According to the aforementioned conventional techniques, the transparency and the heat stretching properties are improved. However, due to the use of the polyamide resin or the reacetylated EVOH, they have disadvantages that: a property for operation for a long time period (long-run workability) is poor; the occurrence of gelation is increased in a long-run operation; and the like. In addition, in such methods involving the use of the different EVOHs, flow marks, which are not typically generated in a single-EVOH system, are generated, and significantly generated in a long-run operation, in particular. The flow marks are generated when the difference of viscosity is caused between two types of EVOHs in an operation over a long time period, resulting in an unstable flow that occurs at a front part of the flow ("flow front" as generally referred to), in the melt molding. These flow marks as well as coloring are causes for unfavorable appearance in the resulting products. Additionally, an odor in molding must be taken into consideration from an environmental viewpoint.

PRIOR ART DOCUMENTS

Patent Documents

Patent Document 1: Japanese Unexamined Patent Application, Publication No. H8-239528
Patent Document 2: Japanese Unexamined Patent Application, Publication No. 2000-212369
Patent Document 3: Japanese Unexamined Patent Application, Publication No. 2001-31821

SUMMARY OF THE INVENTION

Problems to be Solved by the Invention

The present invention was made in view of the foregoing circumstances, and an objective of the invention is to provide a resin composition that exhibits inhibited flow marks, coloring and odor in a long-run operation, and is superior in heat stretching properties.

Means for Solving the Problems

According to an aspect of the invention made for solving the aforementioned problems, a resin composition contains: an ethylene-vinyl alcohol copolymer (A) having an ethylene content of 20 mol % or greater and 50 mol % or less; an ethylene-vinyl alcohol copolymer (B) having an ethylene content of 30 mol % or greater and 60 mol % or less; and a saturated carbonyl compound (C) having 3 to 8 carbon atoms, wherein the saturated carbonyl compound (C) is a saturated aldehyde (C-1), a saturated ketone (C-2) or a combination thereof, a value obtained by subtracting the ethylene content of the ethylene-vinyl alcohol copolymer (A) from the ethylene content of the ethylene-vinyl alcohol copolymer (B) is 8 mol % or greater, the mass ratio (A/B) of the ethylene-vinyl alcohol copolymer (A) to the ethylene-vinyl alcohol copolymer (B) is 60/40 or greater and 95/5 or less, and the content of the saturated carbonyl compound (C) with respect to the resin content is 0.01 ppm or greater and less than 100 ppm.

Due to containing two types of EVOHs each having the specified range of the ethylene content and the saturated carbonyl compound (C) in each specified amount, the resin composition according to the aspect of the present invention exhibits inhibited flow marks, coloring and odor in a long-run operation, and is superior in heat stretching properties. The reasons for the achievement of the effects by the resin composition is presumed to be, for example, that the heat stretching properties are improved due to containing the two types of EVOHs, and incorporating thereinto the saturated carbonyl compound (C) in an adequate amount falling within the aforementioned range enables the flow marks to be inhibited through the effects of crosslinking and the like.

The difference between the melting point of the ethylene-vinyl alcohol copolymer (A) and the melting point of the ethylene-vinyl alcohol copolymer (B) is preferably 15° C. or greater. When the melting points of the two types of EVOHs give the difference described above, the heat stretching properties are improved.

The ethylene-vinyl alcohol copolymer (B) preferably has a structural unit represented by the following formula (1), and the percentage content of the structural unit with respect to the total vinyl alcohol units is preferably 0.3 mol % or greater and 40 mol % or less,

[chemical formula 1]

(1)

wherein, in the formula (1), $R^1$, $R^2$, $R^3$ and $R^4$ each independently represent a hydrogen atom, a hydrocarbon group having 1 to 10 carbon atoms or an alkoxy group having 1 to 10 carbon atoms, wherein a part or all of hydrogen atoms included in the hydrocarbon group are unsubstituted or substituted with a hydroxyl group, an alkoxy group, a carboxyl group or a halogen atom, and wherein $R^1$ and $R^2$ optionally represent a ring structure through binding with each other.

Due to the ethylene-vinyl alcohol copolymer (B) having the specified structural unit, the resin composition exhibits further improved heat stretching properties.

The saturated aldehyde (C-1) is preferably propanal, butanal, hexanal or a combination thereof. The saturated ketone (C-2) is preferably acetone, methyl ethyl ketone, 2-hexanone or a combination thereof. Due to containing the specified saturated carbonyl compound as the saturated carbonyl compound (C), the flow marks, the coloring and the odor in a long-run operation mentioned above may be further inhibited, and further superior heat stretching properties may be exhibited.

According to another aspect of the present invention, a multilayer sheet includes: a barrier layer formed from the resin composition according to the aspect of the present invention; and a thermoplastic resin layer laminated on at least one face of the barrier layer. Due to including the barrier layer formed from the resin composition exhibiting the aforementioned characteristics, and the thermoplastic resin layer, the multilayer sheet exhibits superior appearance characteristics and heat stretching properties.

According to the multilayer sheet, the barrier layer and the thermoplastic resin layer are preferably laminated by a coextrusion molding process. Due to the two types of layers being laminated by the coextrusion molding process, the multilayer sheet can be easily and reliably produced, as a result, the superior appearance characteristics and heat stretching properties can be effectively achieved.

According to still another aspect of the present invention, a packaging material may be formed from the multilayer sheet according to the another aspect of the present invention by a heat-stretching process. Since the packaging material is formed using the aforementioned multilayer sheet through the specified forming process, the packaging material can be easily and reliably produced, and exhibits superior appearance characteristics and inhibited flow marks. Moreover, according to yet still another aspect of the present invention, a container is formed from the multilayer sheet according to the another aspect of the present invention using a vacuum/pressure forming process. Since the container is formed using the aforementioned multilayer sheet through the specified forming process, the container can be easily and reliably produced, and exhibits superior appearance characteristics and inhibited flow marks. Moreover, in the container, the continuity of the resin composition layer is maintained, resulting in superior gas barrier properties.

Effects of the Invention

As explained in the foregoing, the resin composition according to the aspect of the present invention exhibits inhibited flow marks, coloring and odor in a long-run operation, and is superior in heat stretching properties; therefore, the resin composition enables formed products exhibiting superior appearance characteristics and inhibited flow marks to be formed. The multilayer sheet according to the another aspect of the present invention exhibits superior appearance characteristics and heat stretching properties. The packaging material according to the still another aspect of the present invention exhibits superior appearance characteristics and inhibited flow marks. The container according to the yet still another aspect of the present invention exhibits superior appearance characteristics and superior flow mark-inhibitory characteristics, and additionally in the container, the continuity of the resin composition layer is maintained, resulting in superior gas barrier properties. Therefore, the resin composition, the multilayer sheet, the packaging material and the container can be suitably used as materials for packaging and the like that are superior in appearance characteristics, suitability for secondary processing, mechanical strength and the like.

DESCRIPTION OF EMBODIMENTS

Hereinafter, embodiments of the present invention will be described. However, the present invention is by no means limited to the following embodiments. In addition, with respect to materials exemplified in the following, one type of the materials may be used alone, or two or more types thereof may be used in combination, unless otherwise specified particularly.

Resin Composition

The resin composition according to an embodiment of the present invention contains two types of EVOHs, EVOH (A) and EVOH (B), each having a different ethylene unit content, and a saturated carbonyl compound (C). The resin composition may also contain an optional component such as a boron compound, a conjugated polyene compound, an acetic acid compound and a phosphorus compound, within a range not leading to impairment of the effects of the present invention. Hereinafter, each component will be described.

EVOH (A)

The EVOH (A) is an ethylene-vinyl alcohol copolymer obtained by saponifying a copolymer of ethylene and a vinyl ester.

The vinyl ester is exemplified by vinyl acetate, vinyl propionate, vinyl pivalate, and the like, and vinyl acetate is preferred. These vinyl esters may be used either alone, or two or more types thereof may be used in combination.

The EVOH (A) may have other structural unit derived from a monomer other than ethylene and the vinyl ester. Such a monomer is exemplified by polymerizable compounds, e.g.: vinylsilane compounds; unsaturated hydrocarbons such as propylene and butylene; unsaturated carboxylic acids such as (meth)acrylic acid; vinylpyrrolidones such as N-vinylpyrrolidone; and the like, and the like. The content of the other structural unit is preferably 0.0002 mol % or greater and 0.2 mol % or less with respect to the total structural units of the EVOH (A).

The ethylene content of the EVOH (A) is 20 mol % or greater and 50 mol % or less. The lower limit of the ethylene content is preferably 24 mol %, and more preferably 27 mol %. The upper limit of the ethylene content is preferably 46 mol %, more preferably 43 mol %, still more preferably 40 mol %, and particularly preferably 36 mol %. When the ethylene content is less than the lower limit, thermal stability in the melt extrusion may be deteriorated, leading to ease of gelation, and consequently defects such as streaks and fish eyes are likely to be generated. In particular, when an operation is made over a long time period under conditions involving a higher temperature or a higher speed than that for general melt extrusion, the gelation is highly likely to occur. On the other hand, when the ethylene content is greater than the upper limit, the gas barrier properties, and the like may be deteriorated, and the advantageous characteristics of the EVOH may not be sufficiently exhibited.

The degree of saponification of the structural unit derived from the vinyl ester in the EVOH (A) is typically 85% or greater, preferably 90% or greater, more preferably 98% or greater, and still more preferably 99% or greater. When the degree of saponification is less than 85%, insufficient thermal stability may be caused.

EVOH (B)

The EVOH (B) is an ethylene-vinyl alcohol copolymer obtained by saponifying an ethylene-vinyl ester copolymer, similarly to the EVOH (A). The type of the vinyl ester which may be used in the production of the EVOH (B), and the scope of the applicable copolymerization component and the amount thereof are similar to those for the EVOH (A). The ethylene content of the EVOH (B) is 30 mol % or greater and 60 mol % or less. The lower limit of the ethylene content is preferably 35 mol %, and more preferably 38 mol %. The upper limit of the ethylene content is preferably 55 mol %, and more preferably 52 mol %. When the ethylene content is less than the lower limit, the effects of the resin composition in terms of flexibility, secondary processability and heat stretching properties may not be satisfactorily achieved. On the other hand, when the ethylene content is greater than the upper limit, the gas barrier properties of the resin composition against various types of gases may be deteriorated.

The lower limit of the degree of saponification of the vinyl ester unit in the EVOH (B) is preferably 85 mol %, more preferably 90 mol %, still more preferably 95 mol %, and particularly preferably 99 mol %. Moreover, the upper limit of the degree of saponification is preferably 99.99 mol %, more preferably 99.98 mol %, and still more preferably 99.95 mol %. When the degree of saponification of the EVOH (B) falls within the above range, the heat stretching properties of the resin composition can be further improved without deteriorating the thermal stability and gas barrier properties. When the degree of saponification is less than the lower limit, insufficient thermal stability of the resin composition may be caused. When the degree of saponification is greater than the upper limit, the time period required for the saponification may be increased, and thus the productivity of the EVOH (B) may be deteriorated.

In light of an improvement of the flexibility, the secondary processing characteristics and the heat stretching properties of the resin composition, the EVOH (B) may be a modified ethylene-vinyl alcohol copolymer (hereinafter, may be abbreviated as "modified EVOH"). The modified EVOH is exemplified by EVOHs having the structural unit (I) represented by the following formula (1), and the like. The lower limit of the percentage content of the structural unit (I) with respect to the total vinyl alcohol units constituting the EVOH (B) is preferably 0.3 mol %, more preferably 0.5 mol %, still more preferably 1 mol %, and particularly preferably 1.5 mol %. On the other hand, the upper limit of the percentage content of the structural unit (I) is preferably 40 mol %, more preferably 20 mol %, still more preferably 15 mol %, and particularly preferably 10 mol %. It is to be noted that the "vinyl alcohol units constituting the EVOH" as referred to means a structural unit represented by —CH$_2$CH(OH)— and a structural unit derived from the aforementioned structural unit by substituting the hydrogen atom of the hydroxyl group with other group.

[chemical formula 2]

(1)

In the above formula (1), $R^1$, $R^2$, $R^3$ and $R^4$ each independently represent a hydrogen atom, a hydrocarbon group having 1 to 10 carbon atoms or an alkoxy group having 1 to 10 carbon atoms, wherein a part or all of hydrogen atoms included in the hydrocarbon group are unsubstituted or substituted with a hydroxyl group, an alkoxy group, a carboxyl group or a halogen atom, and wherein $R^1$ and $R^2$ optionally represent a ring structure through binding with each other.

The method for producing the modified EVOH is not particularly limited, and is exemplified by a method in which the EVOH is reacted with an epoxy compound having a molecular weight of 500 or less to obtain the modified EVOH, and the like. EVOH similar to the aforementioned EVOH may be used as a basic material of the modified EVOH. The epoxy compound having a molecular weight of 500 or less is preferably an epoxy compound having 2 to 8 carbon atoms. In light of the ease of handling of the compound and the reactivity with the EVOH, an epoxy compound having 2 to 6 carbon atoms is more preferred, and an epoxy compound having 2 to 4 carbon atoms is still more preferred. Of these, in light of the reactivity with the EVOH, and the gas barrier properties of the resulting EVOH (B), the epoxy compound having a molecular weight of 500 or less is preferably 1,2-epoxybutane, 2,3-epoxybutane, epoxypropane, epoxyethane and glycidol, and epoxypropane and glycidol are more preferred.

The lower limit of the value obtained by subtracting the ethylene content of the EVOH (A) from the ethylene content of the EVOH (B) is 8 mol %, preferably 12 mol %, more preferably 15 mol %, and still more preferably 18 mol %. Moreover, the upper limit of the value is preferably 40 mol %, more preferably 30 mol %, and still more preferably 20 mol %. When the difference between the ethylene content of the EVOH (A) and the ethylene content of the EVOH (B) is less than the lower limit, the heat stretching properties of the resin composition may be insufficient. To the contrary, when the difference between the ethylene contents is greater than the upper limit, flow marks-inhibitory effects of the resin composition in a long-run operation may be insufficient.

The lower limit of the difference between the melting point of the EVOH (A) and the melting point of the EVOH (B) is preferably 15° C., and more preferably 22° C. The upper limit of the difference between the melting point of the EVOH (A) and the melting point of the EVOH (B) is preferably 80° C., more preferably 40° C., still more preferably 34° C., and particularly preferably 28° C. When the difference between the melting points is less than the lower limit, the heat stretching properties of the resin composition may be insufficient. To the contrary, when the difference between the melting points is greater than the upper limit, the flow mark inhibitory effects of the resin composition in a long-run operation may be insufficient.

In regard to the content of the EVOH (A) and the EVOH (B) in the resin composition, the lower limit of the mass ratio (A/B) of the EVOH (A) to the EVOH (B) is 60/40, preferably 65/35, and more preferably 70/30. Moreover, the upper limit of the mass ratio (A/B) of the EVOH (A) to the EVOH (B) is 95/5, preferably 90/10, and more preferably 85/15. When the mass ratio is less than the lower limit, the gas barrier properties of the resin composition against various types of gases and oil resistance of the resin composition may be deteriorated. On the other hand, when the mass ratio is greater than the upper limit, the flexibility, the heat stretching properties and the secondary processability of the resin composition may be deteriorated.

The total mass of the EVOH (A) and the EVOH (B) with respect to the resin content in the resin composition is preferably 80% by mass or greater, more preferably 90% by mass or greater, still more preferably 95% by mass or greater, and particularly preferably 100% by mass.

Saturated Carbonyl Compound (C)

The resin composition according to the embodiment of the present invention contains the saturated carbonyl compound (C), and therefore exhibits inhibited flow marks, coloring and odor in a long-run operation, and is superior in heat stretching properties, thereby enabling formed products exhibiting superior appearance characteristics and inhibited flow marks to be formed. The saturated carbonyl compound (C) is any of a saturated aldehyde (C-1) and a saturated ketone (C-2) or a combination thereof. The "saturated carbonyl compound (C)" as referred to herein means a compound that does not include an unsaturated bond in a moiety other than the carbonyl group.

The saturated aldehyde (C-1) may be a linear aldehyde, a branched aldehyde, or an aldehyde having a ring structure in a molecule thereof as long as the saturated aldehyde (C-1) does not include an unsaturated bond in the moiety other than the aldehyde group. The saturated aldehyde (C-1) may have one, or two or more carbonyl groups in a molecule thereof. The saturated aldehyde (C-1) is exemplified by a saturated aliphatic aldehyde and the like.

Examples of the saturated aliphatic aldehyde include propanal, butanal, pentanal, hexanal, heptanal, octanal, cyclohexanecarbaldehyde, cyclopentanecarbaldehyde, methylcyclohexanecarbaldehyde, methylcyclopentanecarbaldehyde, and the like.

The saturated ketone (C-2) may be a linear ketone, a branched ketone, or a ketone having a ring structure in a molecule as long as the saturated ketone (C-2) does not include an unsaturated bond in the moiety other than the carbonyl group. The saturated ketone (C-2) may have one, or two or more carbonyl groups in a molecule thereof. The saturated ketone (C-2) is exemplified by a saturated aliphatic ketone, a saturated cyclic ketone, and the like.

Examples of the saturated aliphatic ketone include acetone, methyl ethyl ketone, 2-pentanone, 3-pentanone, 3-methyl-2-butanone, 2-hexanone, 3-hexanone, 4-methyl-2-pentanone, 2-methyl-3-pentanone, 3,3-dimethyl-2-butanone, 2-heptanone, 3-heptanone, 4-heptanone, 4-methyl-2-hexanone, 5-methyl-2-hexanone, 2,4-dimethyl-3-pentanone, 2-octanone, 3-methyl-2-heptanone, 5-methyl-3-heptanone, 3-octanone, 6-methyl-2-heptanone, methyl cyclopentyl ketone, methyl cyclohexyl ketone, and the like. Examples of the saturated cyclic ketone include cyclobutanone, cyclopentanone, cyclohexanone, cycloheptanone, cyclooctanone, and the like.

In light of an improvement of the solubility of the saturated carbonyl compound (C) in water, the number of carbon atoms of the saturated carbonyl compound (C) is preferably 3 to 50, more preferably 3 to 15, and still more preferably 3 to 8. In light of the inhibition of the coloring and the generation of the defects due to the melt molding, and an improvement of the long-run workability, the saturated aldehyde (C-1) is preferably propanal, butanal, hexanal or a combination thereof, and more preferably propanal, among the saturated aldehydes exemplified. In light of the inhibition of the coloring and the generation of the defects due to the melt molding, and an improvement of the long-run workability, the saturated ketone (C-2) is preferably the saturated aliphatic ketone, more preferably acetone, methyl ethyl ketone, 2-hexanone or a combination thereof, and still more preferably acetone, among the saturated ketones exemplified.

A part or all of hydrogen atoms included in the saturated carbonyl compound (C) (except for the hydrogen atom of the aldehyde group of the saturated aldehyde (C-1)) may be substituted with a substituent within a range not leading to impairment of the effects of the present invention. The substituent is exemplified by a halogen atom, a hydroxy group, an amino group, an amide group, a cyano group, and the like.

The content of the saturated carbonyl compound (C) with respect to the resin content is 0.01 ppm or greater and less than 100 ppm. The lower limit of the content with respect to the resin content is preferably 0.05 ppm, more preferably 0.1 ppm, still more preferably 0.15 ppm, and particularly preferably 0.2 ppm. On the other hand, the upper limit of the content with respect to the resin content is preferably 95 ppm, more preferably 50 ppm, still more preferably 30 ppm, and particularly preferably 20 ppm. When the content is less than the lower limit, the flow marks-inhibitory effect of the resin composition in a long-run operation may be insufficient. To the contrary, when the content is greater than the upper limit, crosslinking involving the saturated carbonyl compound (C) in the resin composition is likely to significantly occur during melt molding, and the occurrence of gelation may be induced. Moreover, the resin composition is likely to be colored. The phrase "content of the saturated carbonyl compound (C) in the resin composition" as referred herein to means a proportion with respect to the resin content in the resin composition, i.e., a mass proportion with respect to the total mass of the resin component, and specifically, a proportion with respect to the resin content in the dried resin composition.

Optional Component

Boron Compound

The boron compound inhibits gelation in the melt molding, and additionally inhibits a torque fluctuation of an extrusion molding machine or the like, i.e., a variation of a viscosity during heating.

Examples of the boron compound include:

boric acids such as orthoboric acid, metaboric acid and tetraboric acid; boric acid esters such as triethyl borate and trimethyl borate;

boric acid salts such as alkali metal salts and alkaline earth metal salts of the aforementioned boric acids, and borax;

boron hydrides; and the like. Of these, boric acids are preferred, and orthoboric acid is more preferred.

The lower limit of the content of the boron compound in the resin composition is preferably 100 ppm, and more preferably 150 ppm. The upper limit of the content of the boron compound is preferably 5,000 ppm, more preferably 4,000 ppm, and still more preferably 3,000 ppm. When the content of the boron compound is less than the lower limit, a torque fluctuation of an extrusion molding machine or the like may not be sufficiently inhibited. On the other hand, when the content of the boron compound is greater than the upper limit, gelation is likely to occur during the melt molding, and consequently the appearance of the formed article may be deteriorated.

Conjugated Polyene Compound

The conjugated polyene compound inhibits oxidative degradation in melt molding. The "conjugated polyene compound" as referred to herein means a compound having a conjugated double bond, as generally referred to, i.e., a compound having two or more carbon-carbon double bonds and a structure in which a carbon-carbon double bond and a carbon-carbon single bond are alternately connected. The conjugated polyene compound may be a conjugated diene including two double bonds involved in the conjugation, a conjugated triene including three double bonds involved in the conjugation, or a conjugated polyene including four or more double bonds involved in the conjugation. In addition, the conjugated double bond may be present in a multiple number in a single molecule without being conjugated with one another. For example, compounds having three conjugated triene structures in a single molecule, such as tung oil, may also be included in the conjugated polyene compound.

The conjugated polyene compound preferably has 7 or less conjugated double bonds. When the resin composition contains a conjugated polyene compound having 8 or more conjugated double bonds, the coloring of the formed article is highly likely to occur. The conjugated polyene compound may be used either alone, or two or more types thereof may be used in combination. The conjugated polyene compound has preferably 4 to 30 carbon atoms, and more preferably 4 to 10 carbon atoms. The conjugated polyene compound is preferably an aliphatic conjugated polyenecarboxylic acid or a salt thereof, myrcene, or a mixture of two or more of these, and sorbic acid, a sorbic acid salt (sodium sorbate, potassium sorbate, or the like) or a mixture thereof is more preferred. Sorbic acid, a sorbic acid salt and a mixture thereof exhibit superior inhibitory effects on oxidative degradation at high temperatures, and are preferred also in light of hygienic properties and availability since they are industrially used broadly also as food additives. The molecular weight of the conjugated polyene compound is preferably 1,000 or less. When the molecular weight of the conjugated polyene compound is greater than 1,000, the state of dispersion of the conjugated polyene compound in the EVOH (A) and EVOH (B) may be inferior, and the appearance after the melt molding may be unfavorable. The lower limit of the content of the conjugated polyene compound in the resin composition is preferably 0.01 ppm, and the upper limit of the content is preferably 1,000 ppm. When the content of the conjugated polyene compound is less than the lower limit, the inhibitory effects on oxidative degradation in the melt molding may not be sufficiently achieved. On the other hand, when the content of the conjugated polyene compound is greater than the upper limit, the gelation of the resin composition may be facilitated.

Japanese Unexamined Patent Application, Publication No. H9-71620 discloses that when a conjugated polyene compound is added in a step following the polymerization step, a resin composition containing less gelled matter generated can be obtained in forming; however, in the present invention, since the saturated carbonyl compound (C) is also added in addition to the conjugated polyene compound, the coloring and the generation of defects such as fish eyes can be further inhibited, leading to an improvement of appearance characteristics of the formed articles, and additionally a resin composition also exhibiting superior long-run workability can be obtained.

Acetic Acid

The acetic acid prevents the coloring of the formed article, and additionally inhibits gelation during melt molding. The lower limit of the content of acetic acid in the resin composition is preferably 50 ppm, more preferably 100 ppm, still more preferably 150 ppm, and particularly preferably 200 ppm. The upper limit of the content of acetic acid is preferably 1,000 ppm, more preferably 500 ppm, and still more preferably 400 ppm. When the content of acetic acid is less than the lower limit, sufficient coloring preventive effects may not be achieved, and yellowing of the formed article may occur. On the other hand, the content of acetic acid is greater than the upper limit, gelation is likely to occur in the melt molding, in particular, in melt molding over a long time period, and consequently the appearance of the formed article may be deteriorated.

Phosphorus Compound

The phosphorus compound inhibits the coloring and the generation of defects such as streaks and fish eyes, and additionally improves the long-run workability. Examples of the phosphorus compound include various types of phosphoric acids such as phosphoric acid and phosphorous acid, phosphates, and the like.

The phosphate may be in any form of a monobasic phosphate salt, a dibasic phosphate salt and a tribasic phosphate salt. In addition, the cationic species contained in the phosphate is not particularly limited, and alkali metal salts and alkaline earth metal salts are preferred. Of these, sodium dihydrogen phosphate, potassium dihydrogen phosphate, disodium hydrogen phosphate and dipotassium hydrogen phosphate are more preferred, and sodium dihydrogen phosphate and dipotassium hydrogen phosphate are still more preferred. The lower limit of the content of the phosphorus compound in the resin composition is preferably 1 ppm. The upper limit of the content of the phosphorus compound is preferably 200 ppm. When the content of the phosphorus compound is less than the lower limit, or when the phosphorus compound is greater than the upper limit, the thermal stability may be deteriorated, and the coloring and the occurrence of gelation are likely to occur in the melt molding over a long time period.

Other Optional Component

The resin composition may contain other optional component, within a range not leading to impairment of the effects of the present invention. The other optional component is exemplified by an alkali metal, an antioxidant, an UV absorbent, a plasticizer, an antistatic agent, a lubricant, a colorant, a filler, a heat stabilizer, other resin, and the like. The resin composition may contain two or more types of these optional components, and the total content of the optional component is preferably 1% by mass or less with respect to the resin composition.

Examples of the alkali metal include lithium, sodium, potassium, and the like. Moreover, examples of the alkali metal salt include aliphatic carboxylic acid salts, aromatic carboxylic acid salts, metal complexes and the like of a monovalent metal, and specific examples thereof include sodium acetate, potassium acetate, sodium stearate, potassium stearate, ethylenediaminetetraacetic acid sodium salt, and the like. Of these, sodium acetate and potassium acetate are preferred. The content of the alkali metal in the resin composition is preferably 20 ppm or greater and 1,000 ppm or less, and more preferably 50 ppm or greater and 500 ppm or less.

It is to be noted that in order to inhibit the gelation, for example, a hindered phenol compound, a hindered amine compound, a hydrotalcite compound or the like may be added. These may be used either alone, or two or more types thereof may be used in combination. The amount of the compound added to inhibit the gelation is typically 0.01% by mass or greater and 1% by mass or less.

Production Method of Resin Composition

The production method of the resin composition is not particularly limited as long as the EVOH (A), the EVOH (B) and the saturated carbonyl compound (C) can be homogeneously blended. The EVOH (A) and the EVOH (B) can be obtained, for example, by a production method including the steps of: copolymerizing ethylene with a vinyl ester (hereinafter, may be also referred to as "step (1)"); and saponifying the copolymer obtained in the step (1) (hereinafter, may be also referred to as "step (2)").

The procedure for incorporating the specified amount of the saturated carbonyl compound (C) into the resin composition is not particularly limited, and is exemplified by: a procedure in which the specified amount of the saturated carbonyl compound (C) is added in the step (1); a procedure in which the specified amount of the saturated carbonyl compound (C) is added in the step (2); a procedure in which the specified amount of the saturated carbonyl compound (C) is added to the EVOH (A) and EVOH (B) obtained in the step (2); and the like.

When the procedure in which the specified amount of the saturated carbonyl compound (C) is added in the step (1), or the procedure in which the specified amount of the saturated carbonyl compound (C) is added in the step (2) is employed, in order to incorporate a desired amount of the saturated carbonyl compound (C) into the resulting resin composition, it is necessary to increase the amount of the added saturated carbonyl compound (C) taking into consideration the amount of the saturated carbonyl compound (C) consumed in the polymerization reaction in the step (1) and/or the saponification reaction in the step (2). However, too large amount of the saturated carbonyl compound (C) may inhibit these reactions. Moreover, since the amount of the consumed saturated carbonyl compound (C) may vary depending on the conditions of the polymerization reaction in the step (1) or the saponification reaction in the step (2), it would be difficult to regulate the content of the saturated carbonyl compound (C) in the resin composition. Therefore, a procedure in which later than the step (2), the specified amount of the saturated carbonyl compound (C) is added to the EVOH (A) and EVOH (B) obtained in the step (2) is preferred.

The procedure for adding the specified amount of the saturated carbonyl compound (C) to the resin is exemplified by: a procedure in which a blend of saturated carbonyl compound (C) with the resin prepared beforehand is pelletized; a procedure in which a strand obtained by deposition after the saponification of the ethylene-vinyl ester copolymer is impregnated with the saturated carbonyl compound (C); a procedure in which a strand obtained by deposition is impregnated with the saturated carbonyl compound (C) after cutting the strand; a procedure in which the saturated carbonyl compound (C) is added to a solution of redissolved chips of a dry resin composition; a procedure in which the resin and the saturated carbonyl compound (C) are melt kneaded: a procedure in which the saturated carbonyl compound (C) is fed to be contained in a melt of the resin during extrusion; a procedure in which a masterbatch is produced by blending a high concentration of the saturated carbonyl compound (C) with a part of the resin and pelletizing the blend, and the masterbatch is dry-blended with the resin to give a mixture which is then melt-kneaded; and the like.

Of these, in light of a possibility of homogeneously dispersing a slight amount of the saturated carbonyl compound (C) in the resin, the procedure in which a blend of saturated carbonyl compound (C) with the resin prepared beforehand is pelletized is preferred as the procedure for adding the saturated carbonyl compound (C). Specifically, the addition of the saturated carbonyl compound (C) is preferably carried out by adding the saturated carbonyl compound (C) to a solution prepared by dissolving the resin in a good solvent such as a mixed solvent of water and methanol, and extruding thus resulting mixture solution into a poor solvent through a nozzle or the like to permit deposition and coagulation, followed by washing and drying the same. In this procedure, the resin composition is obtained in the form of pellets in which the saturated carbonyl compound (C) is homogeneously mixed with the resin.

The procedure for incorporating each component other than the saturated carbonyl compound (C) into the resin composition is exemplified by: a procedure in which the pellets are mixed with each component, followed by melt-kneading; a procedure in which each component is mixed together with the saturated carbonyl compound (C) in preparing the pellets: a procedure in which the pellets are immersed in a solution containing each component, and the like. It is to be noted that a ribbon blender, a high speed mixer, a cokneader, a mixing roll, an extruder, an intensive mixer and the like may be employed for mixing the pellets and other component(s).

Formed Product

The formed product according to another embodiment of the present invention can be formed from the resin composition described above. The formed product is exemplified by a film, a sheet, a container, a pipe, a hose, a fiber, a packaging material, and the like. The "film" as referred to means a formed product typically having a thickness of less than 300 μm, whereas the "sheet" as referred to means a formed product typically having a thickness of 300 μm or greater. The formed product may be formed, for example, by melt molding, and a secondary forming processing as needed. Examples of the method for the melt molding include extrusion molding, inflation extrusion, blow molding, melt spinning, injection molding, injection blow molding, and the like. The melt molding temperature may vary depending on the melting point of the EVOH (A), and the like, and is preferably 150° C. or greater and 270° C. or less. Examples of the secondary forming processing include bending processing, vacuum forming, blow molding, press forming, and the like.

Although the formed product may be a formed product having a single-layer structure constituted with only a barrier layer formed from the resin composition (hereinafter, may be also referred to as "barrier layer"), the formed product preferably has a multilayer structure including the barrier layer, and other layer laminated on at least one face of the barrier layer, in light of an improvement of functions thereof.

Examples of the formed product having a multilayer structure include multilayer sheets, multilayer pipes, multilayer fibers, and the like. The other layer constituting the formed product having a multilayer structure is preferably, for example, a thermoplastic resin layer formed from the thermoplastic resin. When the formed product having a multilayer structure includes the barrier layer and the thermoplastic resin layer, the formed product exhibits superior appearance characteristics and heat stretching properties.

Examples of the thermoplastic resin include:

high-density, medium-density or low-density polyethylenes;

polyethylenes prepared through copolymerization with vinyl acetate, an acrylic acid ester, or an α-olefin such as butene or hexene;

ionomers;

polypropylene homopolymers;

polypropylenes prepared through copolymerization with an α-olefins such as ethylene, butene or hexene;

polyolefins such as modified polypropylenes obtained by blending a rubber polymer into polypropylenes;

resins obtained by addition or grafting of maleic anhydride to these resins;

polyesters; and the like.

Furthermore, examples of the thermoplastic resin include polyamides, polystyrenes, polyvinyl chlorides, acrylic resins, polyurethanes, polycarbonates, polyvinyl acetates, and the like.

Of these, as the thermoplastic resin, polyethylenes, polypropylenes, polyamides and polyesters are preferred. Specific resin material for forming the thermoplastic resin layer is preferably an unstretched polypropylene film or a nylon 6 film.

Although the layer structure of the formed article having a multilayer structure is not particularly limited, in light of formability and cost, typical examples thereof include "thermoplastic resin layer/barrier layer/thermoplastic resin layer", "barrier layer/adhesive resin layer/thermoplastic resin layer", "thermoplastic resin layer/adhesive resin layer/ barrier layer/adhesive resin layer/thermoplastic resin layer". Of these layer structures, the "thermoplastic resin layer/ barrier layer/thermoplastic resin layer", and the "thermoplastic resin layer/adhesive resin layer/barrier layer/adhesive resin layer/thermoplastic resin layer" are preferred. In a case where the thermoplastic resin layer is provided on two outer sides of the barrier layer, the thermoplastic resin layers provided as two outer layers may be formed of resins different from one another, or may be formed of an identical resin.

The method for producing the formed product having a multilayer structure is not particularly limited, and examples thereof include a extrusion lamination process, a dry lamination process, an extrusion blow molding process, a coextrusion lamination process, a coextrusion molding process, a coextrusion pipe molding process, a coextrusion blow molding process, a coinjection molding process, a solution coating process, and the like.

Of these, the method for producing the multilayer sheet is preferably the coextrusion lamination process or the coextrusion molding process, and more preferably the coextrusion molding process. When the barrier layer and the thermoplastic resin layer are laminated by any of the aforementioned process, the multilayer sheet can be easily and reliably produced, resulting in more superior appearance characteristics and heat stretching properties of the multilayer sheet.

Examples of the procedure for further forming a formed product using the multilayer sheet include a heat-stretching process, a vacuum forming process, a pressure forming process, a vacuum/pressure forming process, a blow molding process, and the like. These forming/molding processes are typically carried out at a temperature falling within the range of the melting point of the EVOH or below. Of these, the heat-stretching process and the vacuum/pressure forming process are preferred. In the heat-stretching process, the multilayer sheet is heated, and then stretched along one direction or a plurality of directions to achieve forming. In the vacuum/pressure forming process, the multilayer sheet is heated, and formed using a combination of a vacuum and a pressure. By way of an example of the formed product, a packaging material formed from the aforementioned multilayer sheet using the heat-stretching process can be easily and reliably produced, and additionally can exhibit superior appearance characteristics and inhibited flow marks. A container formed from the aforementioned multilayer sheet using the vacuum/pressure forming process can be easily and reliably produced, and additionally can exhibit superior appearance characteristics and inhibited flow marks. In addition, the continuity of the resin composition layer can be maintained, leading to superior gas barrier properties.

In the case of the heat-stretching process, the thermoplastic resin which may be used is preferably stretchable at a heat-stretching temperature falling within a range represented by the following inequality (2).

$$X-110 \leq Y \leq X-10 \qquad (2)$$

In the above inequality (2), X represents the melting point (° C.) of the EVOH (A); and Y represents the heat-stretching temperature (° C.). In a case where the packaging material is produced using the multilayer sheet described above through the heat-stretching process, when the resin is used as the thermoplastic resin, more superior appearance characteristics can be exhibited, and additionally defects such as cracks can be further inhibited.

Alternatively, the formed product can also be formed through a coinjection stretch-blow molding process using the aforementioned resin composition and other resin composition. In the coinjection stretch-blow molding process, a preformed product having the multilayer structure through coinjection molding using two or more types of resin compositions, and subsequently the preformed product is subjected to heat stretch-blow molding. Due to being formed using the resin composition exhibiting the aforementioned characteristics through the coinjection stretch-blow molding process, the formed product can be easily and reliably produced, and can exhibit superior appearance characteristics and inhibited flow marks. Examples of the other resin composition include the aforementioned thermoplastic resin, and the like.

It is to be noted that scraps generated in carrying out the thermoforming such as extrusion molding and blow molding, or the like may be blended with the thermoplastic resin layer for recycling, or may be separately used as a recovery layer.

In the aforementioned vacuum/pressure forming process, the multilayer sheet is, for example, heated to be softened, and thereafter formed so as to fit a die shape. Examples of the forming method include a process in which forming is carried out so as to fit a die shape by means of vacuum or compressed air, which may be used in combination with a plug in addition, if necessary (a straight process, a drape process, an air slip process, a snap-back process, a plug-assist process, and the like), a press forming process, and the like. Various types of forming conditions such as the forming temperature, the degree of vacuum and the pressure of the compressed air and the forming speed may be appropriately decided in accordance with the shape of the plug and/or the die or properties of a film and/or a sheet as a base material, and the like.

The forming temperature is not particularly limited as long as the resin is softened sufficiently to be formed at the temperature. For example, in a case where the multilayer sheet is subjected to thermoforming, it is desired that the temperature of heating is not: too high where melting of the multilayer sheet by heating occurs or the roughness of a metal surface of a heater plate is transferred to the multilayer sheet; or too low where shaping cannot be sufficiently attained. Specifically, the temperature of the multilayer sheet is 50° C. to 180° C., suitably 60° C. to 160° C.

The container according to still another embodiment of the present invention is produced by thermoforming the multilayer sheet into a three-dimensional shape such that a recessed part is provided on the plane of the multilayer sheet. The container is suitably formed through the aforementioned vacuum/pressure forming process. The shape of the recessed part is decided in accordance with the shape of the contents. In particular, as the depth of the recessed part is greater, or as the shape of the recessed part is less smooth, the improvement effect exerted by the present invention is significant since for such a shape of the recessed part, typical EVOH laminates are more likely to cause unevenness in thickness, leading to extreme slimming at corner portions and the like. In a case where the container is formed of a multilayer sheet having an entire layer thickness of less than about 300 µm, the effects of the invention may be exhibited more effectively at a draw ratio (S) of suitably 0.2 or greater, more suitably 0.3 or greater, and still more suitably 0.4 or greater. Alternatively, in a case where the container is formed from a multilayer sheet having a the entire layer thickness of about 300 µm or greater, the effects of the invention may be exhibited more effectively at a draw ratio (S) of suitably 0.3 or greater, more suitably 0.5 or greater, and still more suitably 0.8 or greater.

The draw ratio (S) as referred to herein means a value calculated using the following formula (3).

$$S = (\text{a depth of the container})/(\text{the diameter of the largest circle inscribed in the opening of the container}) \quad (3)$$

In other words, the draw ratio (S) is a value obtained by dividing a value of the depth of the bottom of the recessed part of the container by a value of the diameter of the largest inscribed circle tangent to the shape of the recessed part (opening) provided on the plane of the multilayer sheet. The value of the diameter of the largest inscribed circle corresponds to, for example: a diameter of a circular shape when the shape of the opening of the recessed part is circular; a minor axis of an elliptical shape when the shape of the opening of the recessed part is elliptical; and a length of the shorter side of a rectangular shape when the shape of the opening of the recessed part is rectangular.

EXAMPLES

Hereinafter, the present invention is specifically explained by way of Examples, but the present invention is not in anyhow limited to these Examples. It is to be noted that each quantitative determination in these Examples was carried out using the following method.

Determination of Moisture Content of Hydrous EVOH Pellets

The moisture content of hydrous EVOH pellets was determined under conditions involving a drying temperature of 180° C., a drying time period of 20 min and a sample amount of about 10 g using a halogen moisture analyzer "HR73" available from Mettler-Toledo International Inc. The moisture content of the hydrous EVOH set forth in the following is expressed in % by mass with respect to the mass of the dry EVOH.

Ethylene Content and Degree of Saponification of EVOHs (A) and (B)

The determination was made based on $^1$H-NMR recorded on a nuclear magnetic resonance apparatus (model "JNM-GX-500" available from JEOL, Ltd.) using DMSO-$d_6$ as a solvent for measurement.

Quantitative Determination of Carboxylic Acid and Carboxylic Aid Ion

Dry EVOH pellets were ground by freeze grinding. Thus resulting ground EVOH was sieved with a sieve having a nominal dimension of 1 mm (according to normal sieve standard JIS Z8801-1 to 3). Ten grams of the EVOH powder having passed the sieve and 50 mL of ion exchanged water were charged into a stoppered 100 mL Erlenmeyer flask, and stirred 95° C. for 10 hours after the stoppered Erlenmeyer flask was equipped with a cooling condenser. Two mL of the resulting solution was diluted with 8 mL of ion exchanged water. The amount of a carboxylic acid ion in this diluted solution was quantitatively determined using an ion chromatography "ICS-1500" available from Yokogawa Electric Corporation according to the following measurement conditions, whereby the amount of the carboxylic acid and the carboxylic acid ion was calculated. It is to be noted that in the quantitative determination, a calibration curve created using a monocarboxylic acid or a polyhydric carboxylic acid was used.

Measurement Conditions:

column: "IonPAC ICE-AS1 (9φ×250 mm, electric conductivity detector)" available from DIONEX;

eluent: 1.0 mmol/L aqueous octanesulfonic acid solution;

measurement temperature: 35° C.;

eluent flow rate: 1 mL/min.; and amount used for the analysis: 50 µL.

Quantitative Determination of Metal Ion

Into a polytetrafluoroethylene pressure container available from Actac Project Services Corporation were charged 0.5 g of dry EVOH pellets, and 5 mL of nitric acid for accurate analysis available from Wako Pure Chemical Industries, Ltd. was further added thereto. After the pressure container was left to stand for 30 min, the container was closed with a cap lip having a rupture disk, and the dry EVOH pellets were treated at 150° C. for 10 min, and then 180° C. for 10 min using a microwave high speed decomposition system "speedwave MWS-2" available from Actac Project Services Corporation, whereby the dry EVOH pellets were decomposed. In a case where the decomposition of the dry EVOH pellets was incomplete, the treatment conditions were appropriately adjusted. The resulting decomposition product was diluted with 10 mL of ion exchanged water, all the liquid was transferred to a 50 mL volumetric flask, and the volume of the liquid was adjusted to 50 mL with ion exchanged water, whereby a decomposition product solution was prepared.

The decomposition product solution thus obtained was subjected to a quantitative determination analysis at the measurement wavelength set forth below using an ICP optical emission spectrophotometer "Optima 4300 DV" available from PerkinElmer Japan Co., Ltd., whereby the amounts of the metal ion, the phosphorus compound and the boron compound were quantitatively determined. The amount of the phosphorus compound was calculated as a mass in terms of phosphorus element equivalent after the quantitative determination of the phosphorus element. The content of the boron compound was calculated as a mass in terms of boric acid equivalent.

Na: 589.592 nm;
K: 766.490 nm;
Mg: 285.213 nm;
Ca: 317.933 nm;
P: 214.914 nm;
B: 249.667 nm;
Si: 251.611 nm;
Al: 396.153 nm;
Zr: 343.823 nm;
Ce: 413.764 nm;
W: 207.912 nm; and
Mo: 202.031 nm.

Quantitative Determination of Saturated Carbonyl Compound (C)

A 2,4-dinitrophenylhydrazine (DNPH) solution was prepared by adding 50 mL of 1,1,1,3,3,3-hexafluoroisopropanol (HFIP), 11.5 mL of acetic acid and 8 mL of ion exchanged water to 200 mg of a 50% by mass aqueous solution of DNPH. Sample pellets in an amount of 1 g were added to 20 mL of the DNPH solution, and the sample pellets were dissolved at 35° C. for 1 hour with stirring. Acetonitrile was added to this solution to permit precipitation and sedimentation of the resin content, followed by filtration, and the resulting solution was concentrated, whereby an extraction sample was obtained. This extraction sample was analyzed for quantitative determination by high performance liquid chromatography under the following conditions, whereby the saturated carbonyl compound (C) was quantitatively determined. In the quantitative determination, a calibration curve created from a reaction of an authentic sample of each saturated carbonyl compound (C) with the DNPH solution was used. It is to be noted that the detection lower limit of the saturated carbonyl compound (C) was 0.01 ppm.

column: TSKgel ODS-80Ts (available from Tosoh Corporation)
mobile phase: water/acetonitrile=52:48 (volume ratio)
detector: photodiode array detector (360 nm), TOF-MS Quantitative Determination of Conjugated Polyene Compound Dry resin composition pellets were ground by freeze grinding, and 10 g of a ground matter obtained by eliminating coarse particles using a sieve having a nominal dimension of 0.150 mm (100 mesh, according to JIS Z8801-1 to 3) was packed into a Soxhlet extraction apparatus to execute an extraction treatment using 100 mL of chloroform for 48 hours. This extraction liquid was analyzed for quantitative determination by high performance liquid chromatography to quantitatively determine the amount of the conjugated polyene compound. It is to be noted that in the quantitative determination, a calibration curve created using an authentic sample of each conjugated polyene compound was used.

Synthesis of EVOH (A)

Synthesis Example 1

Using a 250 L pressure reactor, the polymerization was carried out under the following conditions to synthesize an ethylene-vinyl acetate copolymer.

Amount Charged
vinyl acetate: 83.0 kg
methanol: 17.4 kg
2,2'-azobisisobutyl nitrile: 66.4 g
polymerization temperature: 60° C.

Polymerization Conditions
pressure of ethylene in polymerization tank: 3.9 MPa
polymerization time period: 3.5 hours The conversion of vinyl acetate in the polymerization was 36%. After sorbic acid was added to the resulting copolymerization reaction mixture, the reaction mixture was supplied to a purge tower, and unreacted vinyl acetate was eliminated from the top of the tower by introducing methanol vapor from the bottom of the tower, whereby a 41% by mass methanol solution of the ethylene-vinyl acetate copolymer was obtained. This ethylene-vinyl acetate copolymer had an ethylene content of 32 mol %. This methanol solution of the ethylene-vinyl acetate copolymer was charged into a saponification reactor, and a solution of sodium hydroxide in methanol (80 g/L) was added so as to attain 0.4 equivalents with respect to the vinyl ester unit in the copolymer. Thereto was further added methanol to adjust the copolymer concentration to 20% by mass. The temperature of this solution was elevated to 60° C., and the reaction was allowed while blowing nitrogen gas into the reactor for about 4 hours. This solution was then extruded into water from a die plate provided with a circular opening to permit deposition, followed by cutting to give pellets having a diameter about of 3 mm and a length about of 5 mm. The pellets were subjected to deliquoring using a centrifugal separator, and an operation of further adding a large amount of water thereto and deliquoring the pellets was repeated to wash the pellets, whereby pellets of the EVOH (A) was obtained. The degree of saponification of the EVOH (A) thus obtained was 99.95 mol %.

Moreover, EVOHs (A) having a predetermined ethylene content (degree of saponification: 99.95 mol %) shown in Table 1 below were synthesized in a similar manner to the procedure described above.

Synthesis Example 2

Pellets were obtained by polymerizing, saponifying, pelletizing and washing in a similar manner to Synthesis Example 1 except that propanal was supplied so as to be contained in an amount of 0.5 ppm with respect of the EVOH during the polymerization. The degree of saponification of the EVOH (A) thus obtained was 99.95 mol %.

Synthesis Example 3

Pellets were obtained by polymerizing, saponifying, pelletizing and washing in a similar manner to Synthesis Example 1 except that acetone was supplied so as to be contained in an amount of 0.5 ppm with respect of the EVOH during the polymerization. The degree of saponification of the EVOH (A) thus obtained was 99.95 mol %.
Synthesis of EVOH (B)

Synthesis Example 4

EVOH (B) having an ethylene content of 44 mol % and a degree of saponification of 99.95 mol % was synthesized in the form of pellets in a similar manner to the synthesis method of the EVOH (A) according to Synthesis Example 1.

In addition, EVOHs (B) having a predetermined ethylene content shown in Table 1 below (degree of saponification being 99.95 mol %) were synthesized in a similar manner.

Synthesis Example 5

EVOH (B) having an ethylene content of 44 mol % and a degree of saponification of 90 mol % was synthesized in the form of pellets in a similar manner to the synthesis method of the EVOH (A) according to Synthesis Example 2.

Synthesis Example 6

EVOH (B) having an ethylene content of 44 mol % and a degree of saponification of 90 mol % was synthesized in the form of pellets in a similar manner to the synthesis method of the EVOH (A) according to Synthesis Example 3.

Synthesis Example 7

A modified EVOH (B) was synthesized using epoxypropane and the EVOH (B) having an ethylene content of 44 mol % and a degree of saponification of 99.95 mol %, which was obtained in Synthesis Example 4 described above, on "TEM-35BS" (37 mmφ, L/D=52.5) available from Toshiba Machine Co., Ltd., by injecting epoxypropane from a barrel C9 under conditions involving the barrels C2 and C3 at 200° C., barrels C4 to C15 at 240° C. and the number of revolutions of 400 rpm. The degree of modification of the resulting modified EVOH (B) with respect to the total vinyl alcohol units was 8 mol %.

In the case of the degree of saponification of 99.95 mol %, the melting point of the obtained EVOHs was 160° C., 165° C., 177° C., 183° C., 191° C. and 208° C. for the ethylene content of 48 mol %, 44 mol %, 35 mol %, 32 mol %, 27 mol % and 15 mol %, respectively. On the other hand, in the case of the degree of saponification of 90 mol % and the ethylene content of 44 mol %, the melting point of the obtained EVOH was 134° C. The melting point of the modified EVOH (B) was 106° C.
Preparation of Resin Composition

Examples 1 to 10, 14 and 15, and Comparative Examples 2 to 4

Twenty kg of the pellets of the EVOH (A) obtained in Synthesis Example 1 described above were added to 180 kg of a mixed solvent of water and methanol (mass ratio: water/methanol=40/60), and the mixture was stirred at 60° C. for 6 hours to completely dissolve the pellets. To the solution thus obtained were added predetermined amounts of propanal and sorbic acid, and this mixture was further stirred for 1 hour such that propanal was completely dissolved, whereby a resin solution was obtained. This resin solution was continuously extruded from a nozzle having a diameter of 4 mm into a coagulation bath containing a mixture of water and methanol (mass ratio: water/methanol=90/10) adjusted at 0° C. so as to give a strand form. This strand was introduced into a pelletizing machine to obtain porous resin chips. The obtained chips were washed with an aqueous acetic acid solution and ion exchanged water. The chips were separated from the washing liquid, followed by deliquoring, and thereafter dried in hot-air dryer at 80° C. for 4 hours and further 100° C. for 16 hours to obtain propanal-containing EVOH (A) pellets. The content of each component in the pellets obtained was quantitatively determined according to the method for quantitative determination, and the content was designated as the content in the EVOH (A). Similarly, propanal-containing EVOH (B) pellets were obtained in a similar manner from the EVOH (B) obtained in Synthesis Example 4 or Synthesis Example 5 described above. In this procedure, propanal-containing EVOH (A) pellets were prepared such that the content of propanal with respect to the total mass of the EVOH (A) and the EVOH (B) was as shown in Table 1 by determining the content of propanal in the EVOH (B) beforehand through the aforementioned method for quantitative determination, and adjusting the amount of propanal added and the concentration of each component in the aqueous solution for the immersion treatment according to this procedure.

The propanal-containing EVOH (A) pellets, and the EVOH (B) pellets or the propanal-containing EVOH (B) pellets prepared as described above were mixed such that each content was as shown in Table 1. After dry-blending, the blend was subjected to extrusion and pelletization using a twin-screw extruder ("2D25W" available from Toyo Seiki Seisaku-sho, Ltd.; 25 mmφ, a die temperature of 220° C., screw rotation speed of 100 rpm) under a nitrogen atmosphere, whereby intended resin composition pellets were obtained.

Example 11

Twenty kg of pellets of the EVOH (A) obtained in Synthesis Example 1 were added to 180 kg of a mixed solvent of water and methanol (mass ratio: water/methanol=40/60), and the mixture was stirred at 60° C. for 6 hours to completely dissolve the pellets. To the solution thus obtained were added predetermined amounts of propanal and sorbic acid, and this mixture was further stirred for 1 hour such that propanal was completely dissolved, whereby a resin solution was obtained. This resin solution was continuously extruded from a nozzle having a diameter of 4 mm into a coagulation bath containing a mixture of water and methanol (mass ratio: water/methanol=90/10) adjusted at 0° C. so as to give a strand form. This strand was introduced into a pelletizing machine to obtain porous resin chips. The obtained chips were washed with an aqueous acetic acid solution and ion exchanged water. The chips were separated from the washing liquid, followed by deliquoring, and thereafter dried in hot-air dryer at 80° C. for 4 hours and further 100° C. for 16 hours to obtain propanal-containing EVOH (A) pellets. The content of each component in the pellets obtained was quantitatively determined according to the method for quantitative determination, and the content was designated as the content in the EVOH (A). Similarly, propanal-containing EVOH (B) pellets were obtained in a similar manner from the modified EVOH (B) obtained in Synthesis Example 7 described above. In this procedure, the resin composition pellets were prepared in a similar manner to the procedure described above such that the content of propanal with respect to the total mass of the EVOH (A) and the EVOH (B) was as shown in Table 1 by determining the content of propanal in the EVOH (B)

beforehand through the aforementioned method for quantitative determination, and adjusting the amount of propanal added and the concentration of each component in the aqueous solution for the immersion treatment according to this procedure.

Example 12

Resin composition pellets that contained butanal were prepared in a similar manner to Example 1 except that butanal was used in place of propanal in Example 1.

Example 13

Resin composition pellets that contained hexanal were prepared in a similar manner to Example 1 except that hexanal was used in place of acetone in Example 1.

Example 13

Resin composition pellets that contained hexanal were prepared in a similar manner to Example 1 except that hexanal was used in place of propanal in Example 1.

Examples 16 to 25, 29 and 30, and Comparative Examples 6 to 8

Twenty kg of pellets of the EVOH (A) obtained in Synthesis Example 1 were added to 180 kg of a mixed solvent of water and methanol (mass ratio: water/methanol=40/60), and the mixture was stirred at 60° C. for 6 hours to completely dissolve the pellets. To the solution thus obtained were added a predetermined amounts of acetone and sorbic acid, and this mixture was further stirred for 1 hour such that acetone was completely dissolved, whereby a resin solution was obtained. This resin solution was continuously extruded from a nozzle having a diameter of 4 mm into a coagulation bath containing a mixture of water and methanol (mass ratio: water/methanol=90/10) adjusted at 0° C. so as to give a strand form. This strand was introduced into a pelletizing machine to obtain porous resin chips. The obtained chips were washed with an aqueous acetic acid solution and ion exchanged water. The chips were separated from the washing liquid, followed by deliquoring, and thereafter dried in hot-air dryer at 80° C. for 4 hours and further 100° C. for 16 hours to obtain acetone-containing EVOH (A) pellets. The content of each component in the pellets obtained was quantitatively determined according to the method for quantitative determination, and the content was designated as the content in the EVOH (A). Similarly, acetone-containing EVOH (B) pellets were obtained in a similar manner from the EVOH (B) obtained in Synthesis Example 4 or Synthesis Example 6 described above. In this procedure, the acetone-containing EVOH (B) pellets were prepared such that the content of acetone with respect to the total mass of the EVOH (A) and the EVOH (B) was as shown in Table 2 by determining the content of acetone in the EVOH (B) beforehand through the aforementioned method for quantitative determination, and adjusting the amount of acetone added and the concentration of each component in the aqueous solution for the immersion treatment according to this procedure.

Example 26

Twenty kg of pellets of the EVOH (A) obtained in Synthesis Example 1 were added to 180 kg of a mixed solvent of water and methanol (mass ratio: water/methanol=40/60), and the mixture was stirred at 60° C. for 6 hours to completely dissolve the pellets. To the solution thus obtained were added a predetermined amounts of acetone and sorbic acid, and this mixture was further stirred for 1 hour such that acetone was completely dissolved, whereby a resin solution was obtained. This resin solution was continuously extruded from a nozzle having a diameter of 4 mm into a coagulation bath containing a mixture of water and methanol (mass ratio: water/methanol=90/10) adjusted at 0° C. so as to give a strand form. This strand was introduced into a pelletizing machine to obtain porous resin chips. The obtained chips were washed with an aqueous acetic acid solution and ion exchanged water. The chips were separated from the washing liquid, followed by deliquoring, and thereafter dried in hot-air dryer at 80° C. for 4 hours and further 100° C. for 16 hours, acetone-containing EVOH (A) to obtain pellets. The content of each component in the pellets obtained was quantitatively determined according to the method for quantitative determination, and the content was designated as the content in the EVOH (A). Similarly, acetone-containing EVOH (B) pellets were obtained in a similar manner from the modified EVOH (B) obtained in Synthesis Example 7 described above. In this procedure, the resin composition pellets were prepared in a similar manner to the procedure described above such that the content of acetone with respect to the total mass of the EVOH (A) and the EVOH (B) was as shown in Table 2 by determining the content of acetone in the EVOH (B) beforehand through the aforementioned method for quantitative determination, and adjusting the amount of acetone added and the concentration of each component in the aqueous solution for the immersion treatment according to this procedure.

Example 27

Resin composition pellets that contained methyl ethyl ketone were prepared in a similar manner to Example 16 except that methyl ethyl ketone was used in place of acetone in Example 16.

Example 28

Resin composition pellets that contained 2-hexanone were prepared in a similar manner to Example 16 except that 2-hexanone was used in place of acetone in Example 16.

Comparative Example 1

Twenty kg of the pellets obtained in Synthesis Example 2 were washed with an aqueous acetic acid solution and ion exchanged water. The chips were separated from the washing liquid, followed by deliquoring, and thereafter were dried in a hot-air dryer at 80° C. for 4 hours and further 100° C. for 16 hours to obtain EVOH (A) pellets. Similarly, the EVOH (B) obtained in Synthesis Example 5 described above was treated in a similar manner, and thereafter the resin composition pellets were prepared in a similar manner to the procedure described above.

Comparative Example 5

Twenty kg of the pellets obtained in Synthesis Example 3 were washed with an aqueous acetic acid solution and ion exchanged water. The chips were separated from the washing liquid, followed by deliquoring, and thereafter were dried in a hot-air dryer at 80° C. for 4 hours and further 100° C. for 16 hours to obtain EVOH (A) pellets. Similarly, the EVOH (B) obtained in Synthesis Example 6 was treated in a similar manner, and thereafter the resin composition pellets were prepared in a similar manner to the procedure described above.

Evaluation of Resin Composition

Each resin composition thus obtained was evaluated using the following methods. The results of the evaluations are shown together in Tables 1 and 2.

Odor in Molding

Into a 100 mL glass sample tube were charged 20 g of sample pellets of the resin composition, and the opening of the sample tube was covered with an aluminum foil lid. Then, the sample tube was heated in a hot-air dryer at 220° C. for 30 min. The sample tube was taken out from the dryer and allowed to cool at room temperature for 30 min. Thereafter, the sample tube was shaken two or three times, and then an evaluation of the odor was made after removing the aluminum foil lid. The intensity of the odor of the sample pellets was evaluated according to the following criteria.
- A: an odor not being recognized;
- B: an odor being slightly recognized; and
- C: an odor being clearly recognized.

Flow Marks-Inhibitory Effect

Using a single screw extrusion apparatus ("D2020" available from Toyo Seiki Seisaku-sho, Ltd.; D (mm)=20, L/D=20, compression ratio=2.0, screw: full flight), a single-layer film having a thickness of 150 μm was produced from the resin composition pellets obtained in each Example or Comparative Example. The forming conditions are as in the following:

extrusion temperature: 210° C.;
screw rotation speed: 100 rpm;
die width: 15 cm;
roll drawing temperature: 80° C.; and
roll drawing speed: 0.9 m/min.

A continuous operation was carried out under the conditions described above to produce a single-layer film, and the appearance of each film produced after 8 hours from the start of the operation was evaluated by a visual inspection. The flow marks-inhibitory effect was evaluated to be: "A (favorable)" in a case where no flow mark was found; "B (somewhat favorable)" in a case where small flow marks were found or the generation frequency of the flow marks was low; and "C (unfavorable)" in a case where large flow marks were found and the generation frequency of the flow marks was high.

Coloring-Inhibitory Effect

The film obtained after 8 hours in the aforementioned forming was visually inspected to evaluate the coloring thereof in accordance with the following criteria.
"A (favorable)": colorless;
"B (somewhat favorable)": yellowed; and
"C (unfavorable)": significantly yellowed.

Heat Stretching Property

The film obtained as described above was preheated at 80° C. for 30 sec in a pantograph type biaxially stretching apparatus available from Toyo Seiki Seisaku-sho, Ltd., and thereafter simultaneously biaxially stretched with a draw ratio of 3×3 times to obtain a stretched film. The obtained stretched film was visually inspected to evaluate the heat stretching property in accordance with the following criteria.
"A (favorable)": no crack being generated;
"B (somewhat favorable)": cracks being locally generated; and
"C (unfavorable)": cracks being entirely generated.

TABLE 1

| | EVOH (A) | | EVOH (B) | | | | | | Results of evaluations | | | |
|---|---|---|---|---|---|---|---|---|---|---|---|---|
| | ethylene content (mol %) | amount blended (parts by mass) | ethylene content (mol %) | degree of modification (mol %) | degree of saponification (%) | amount blended (parts by mass) | Melting point difference (° C.) | Saturated aldehyde (C-1) sub-stance | content (ppm) | odor in molding | flow marks-inhibi-tory effect | coloring-inhibi-tory effect | heat stretch-ing property |
| Example 1 | 32 | 80 | 44 | 0 | 99.95 | 20 | 18 | propanal | 0.08 | A | B | A | A |
| Example 2 | 32 | 80 | 44 | 0 | 99.95 | 20 | 18 | propanal | 42 | B | A | B | A |
| Example 3 | 32 | 80 | 44 | 0 | 99.95 | 20 | 18 | propanal | 0.3 | A | A | A | A |
| Example 4 | 32 | 90 | 44 | 0 | 99.95 | 10 | 18 | propanal | 0.3 | A | A | A | A |
| Example 5 | 32 | 60 | 44 | 0 | 99.95 | 40 | 18 | propanal | 0.3 | A | A | A | A |
| Example 6 | 27 | 80 | 44 | 0 | 99.95 | 20 | 26 | propanal | 0.3 | A | A | A | A |
| Example 7 | 32 | 80 | 48 | 0 | 99.95 | 20 | 23 | propanal | 0.3 | A | A | A | A |
| Example 8 | 35 | 80 | 44 | 0 | 99.95 | 20 | 12 | propanal | 0.3 | A | A | A | B |
| Example 9 | 27 | 80 | 35 | 0 | 99.95 | 20 | 14 | propanal | 0.3 | A | A | A | B |
| Example 10 | 32 | 80 | 44 | 0 | 90 | 20 | 49 | propanal | 0.3 | B | A | B | A |
| Example 11 | 32 | 90 | 44 | 8 | 99.95 | 10 | 77 | propanal | 0.3 | A | A | A | A |
| Example 12 | 32 | 80 | 44 | 0 | 99.95 | 20 | 18 | butanal | 42 | B | B | B | A |
| Example 13 | 32 | 80 | 44 | 0 | 99.95 | 20 | 18 | hexanal | 42 | B | B | B | A |
| Example 14 | 32 | 80 | 44 | 0 | 99.95 | 20 | 18 | propanal | 0.02 | B | B | B | A |
| Example 15 | 32 | 80 | 44 | 0 | 99.95 | 20 | 18 | propanal | 90 | B | B | B | B |
| Comparative Example 1 | 32 | 80 | 44 | 0 | 99.95 | 20 | 18 | propanal | N.D. *[1] | B | C | B | C |
| Comparative Example 2 | 32 | 80 | 44 | 0 | 99.95 | 20 | 18 | propanal | 100 | C | C | C | C |
| Comparative Example 3 | 15 | 80 | 44 | 0 | 99.95 | 20 | 50 | propanal | 0.3 | C | C | C | C |
| Comparative Example 4 | 32 | 98 | 44 | 0 | 99.95 | 2 | 18 | propanal | 0.3 | A | A | A | C |

*[1] less than detection lower limit (0.01 ppm)

TABLE 2

| | EVOH (A) | | EVOH (B) | | | | | | Results of evaluations | | | |
|---|---|---|---|---|---|---|---|---|---|---|---|---|
| | ethylene content (mol %) | amount blended (parts by mass) | ethylene content (mol %) | degree of modification (mol %) | degree of saponification (%) | amount blended (parts by mass) | Melting point difference (° C.) | Saturated ketone (C-2) | | odor in molding | flow marks-inhibitory effect | coloring-inhibitory effect | heat stretching property |
| | | | | | | | | substance | content (ppm) | | | | |
| Example 16 | 32 | 80 | 44 | 0 | 99.95 | 20 | 18 | acetone | 0.08 | A | B | A | A |
| Example 17 | 32 | 80 | 44 | 0 | 99.95 | 20 | 18 | acetone | 42 | B | B | B | A |
| Example 18 | 32 | 80 | 44 | 0 | 99.95 | 20 | 18 | acetone | 0.3 | A | A | A | A |
| Example 19 | 32 | 90 | 44 | 0 | 99.95 | 10 | 18 | acetone | 0.3 | A | A | A | A |
| Example 20 | 32 | 60 | 44 | 0 | 99.95 | 40 | 18 | acetone | 0.3 | A | A | A | A |
| Example 21 | 27 | 80 | 44 | 0 | 99.95 | 20 | 26 | acetone | 0.3 | A | A | A | A |
| Example 22 | 32 | 80 | 48 | 0 | 99.95 | 20 | 23 | acetone | 0.3 | A | A | A | A |
| Example 23 | 35 | 80 | 44 | 0 | 99.95 | 20 | 12 | acetone | 0.3 | A | A | A | B |
| Example 24 | 27 | 80 | 35 | 0 | 99.95 | 20 | 14 | acetone | 0.3 | A | A | A | B |
| Example 25 | 32 | 80 | 44 | 0 | 90 | 20 | 49 | acetone | 0.3 | A | A | B | A |
| Example 26 | 32 | 90 | 44 | 8 | 99.95 | 10 | 77 | acetone | 0.3 | A | A | A | A |
| Example 27 | 32 | 80 | 44 | 0 | 99.95 | 20 | 18 | methyl ethyl ketone | 42 | B | B | B | A |
| Example 28 | 32 | 80 | 44 | 0 | 99.95 | 20 | 18 | 2-hexanone | 42 | B | B | B | A |
| Example 29 | 32 | 80 | 44 | 0 | 99.95 | 20 | 18 | acetone | 0.02 | B | B | B | A |
| Example 30 | 32 | 80 | 44 | 0 | 99.95 | 20 | 18 | acetone | 90 | B | B | B | B |
| Comparative Example 5 | 32 | 80 | 44 | 0 | 99.95 | 20 | 18 | acetone | N.D. *1 | C | C | C | B |
| Comparative Example 6 | 32 | 80 | 44 | 0 | 99.95 | 20 | 18 | acetone | 100 | C | C | C | C |
| Comparative Example 7 | 15 | 80 | 44 | 0 | 99.95 | 20 | 50 | acetone | 0.3 | C | C | C | C |
| Comparative Example 8 | 32 | 98 | 44 | 0 | 99.95 | 2 | 18 | acetone | 0.3 | B | B | B | C |

*1 less than detection lower limit (0.01 ppm)

As is clear from the results shown in Tables 1 and 2, the resin compositions of Examples were superior in odor-in-molding-inhibitory effect, flow marks-inhibitory effect, coloring-inhibitory effect and heat stretching property. On the other hand, it was proven that the resin compositions of Comparative Examples in which the content of the saturated carbonyl compound (C), the ethylene content of the EVOH, or the mass ratio of the EVOH (A) to the EVOH (B) did not fall within a predetermined range were inferior in the flow marks-inhibitory effect, coloring-inhibitory effect and heat stretching property.

Production of Multilayer Sheet

Example 31

Using an apparatus for forming a coextruded cast film having seven layers of four types shown below, a coextrusion film formation test was carried out using the resin composition obtained as described above.

extruder (1): single screw, screw diameter of 65 mm, L/D=22, for outer polyolefin layer
extruder (2): single screw, screw diameter of 40 mm, L/D=26, for polyolefin
extruder (3): single screw, screw diameter of 40 mm, L/D=22, for adhesive resin
extruder (4): single screw, screw diameter of 40 mm, L/D=26, for the resin composition described above Polypropylenes (hereinafter, may be abbreviated as "PP", and "PP'") was fed to the extruder (1) and the extruder (2), respectively, a maleic anhydride-modified polypropylene adhesive resin ("ADMER QF-500" available from Mitsui Chemicals, Inc.) was fed to the extruder (3), and the resin composition (a) obtained in Example 3 was fed to the extruder (4) to execute coextrusion film formation. The extrusion temperature setting was: 200° C. to 250° C. for the extruder (1); 200° C. to 250° C. for the extruder (2); 160° C. to 250° C. for the extruder (3); 170° C. to 250° C. for the extruder (4), respectively, and the temperature setting of the feed block and die was 250° C. With respect to the structure of the formed multilayer sheet and the thickness of each layer, the symmetric structure having seven layers of four types, i.e., PP/PP'/adhesive resin/(a)/adhesive resin/PP'/PP=30/15/2.5/5/2.5/15/30 μm had the entire layer thickness of 100 μm.

The sheet sampled after 10 hours from the start of the film formation, and the appearance was checked. Consequently, an unfavorable appearance resulting from the aggregation of the EVOH and flow marks resulting from abnormal flow were scarcely found. Accordingly, a practically applicable multilayer sheet was obtained.

Example 32

A coextrusion film formation test was executed in a similar manner to Example 31 except that the resin composition used in Example 31 described above was replaced with the resin composition obtained in Example 18 to obtain a multilayer sheet.

Comparative Example 9

A coextrusion film formation test was executed in a similar manner to Example 31 except that the resin composition used in Example 31 described above was replaced with the resin composition obtained in Comparative Example 1. The sheet was sampled after 10 hours from the start of the film formation, and the appearance was checked. Consequently, a multilayer sheet having an unfavorable appearance resulting from the aggregation of the EVOH and many flow marks resulting from abnormal flow was obtained.

Comparative Example 10

A coextrusion film formation test was executed in a similar manner to Example 31 except that the resin composition used in Example 31 described above was replaced with the resin composition obtained in Comparative Example 5. The sheet was sampled after 10 hours from the start of the film formation, and the appearance was checked. Consequently, a multilayer sheet having an unfavorable appearance resulting from the aggregation of the EVOH and many flow marks resulting from abnormal flow was obtained.

Production of Container

Example 33

The resin composition obtained in Example 3, polyolefin (a), the polyolefin (a') and the carboxylic acid-modified polyolefin (b) were charged into separate extruders under the following conditions for extrusion molding, and a multilayer sheet having an entire layer thickness of 1,000 μm and having seven layers of four types constituting a structure of (a)/(a')/(b)/resin composition/(b)/(a')/(a) (each layer thickness: 200 μm/225 μm/25 μm/100 μm/25 μm/225 μm/200 μm) was obtained using a coextrusion sheet molding apparatus.

Extrusion Conditions of Each Extruder extruder for polyolefin (a): single screw, screw diameter of 65 mm, L/D=22, temperature of 200° C. to 240° C. (polypropylene)

extruder for resin composition obtained in Example 3: single screw, screw diameter of 40 mm, L/D=26, temperature of 170° C. to 210° C.

extruder for carboxylic acid-modified polyolefin (b): single screw, screw diameter of 40 mm, L/D=26, temperature of 160° C. to 220° C. (maleic anhydride-modified polypropylene adhesive resin ("ADMER QF-500" available from Mitsui Chemicals, Inc.)

extruder for polyolefin (a'): single screw, screw diameter of 40 mm, L/D=22, temperature of 160° C. to 210° C. (polypropylene)

Molding Conditions of Coextrusion Sheet Molding Apparatus feed block die (width: 600 mm), temperature of 240° C.

The obtained multilayer sheet was heated for 1.5 sec in a thermoforming machine ("R530" available from MULTI-VAC) in which the temperature of a heater plate was adjusted to 100° C., whereby the temperature of the sheet was elevated to about 85° C. Thereafter, the sheet was placed in a die (giving a cuboid shape having a length of 130 mm, a width of 110 mm and a depth of 50 mm; draw ratio S=0.45), and then compression air (pressure of 5 kgf/cm$^2$ (0.5 MPa)) was blown thereinto to execute forming, whereby a container was obtained. The obtained container exhibited superior appearance characteristics and inhibited flow marks.

Example 34

The multilayer sheet obtained in Example 31 was subjected to thermoforming (thermoforming condition: compression air pressure: 5 kg/cm$^2$ (0.5 MPa); plug: 45φ×65 mm; syntax form; plug temperature: 150° C.; die temperature: 70° C.) into a cup shape (die shape: 70φ×70 mm; draw ratio S=1.0) using a thermoforming machine (available from Asano Laboratories Co. Ltd.) at a temperature of 150° C. The obtained cup container exhibited superior appearance characteristics and inhibited flow marks. In addition, the cup container was cut according to the method described below and the cross section was inspected. Consequently, the continuity of the resin composition layer was found.

Example 35

A multilayer sheet having seven layers of four types was obtained using the coextrusion sheet molding apparatus in a similar manner to Example 33 except that the resin composition used in Example 33 was replaced with the resin composition used in Example 18.

Example 36

A cup container was thermoformed in a similar manner to Example 34 except that the multilayer sheet used in Example 34 was replaced with the multilayer sheet obtained in Example 32.

Evaluation of Container

Each container obtained was evaluated using the following methods. The results of the evaluations are shown in Tables 3 and 4.

Continuity of Resin Composition Layer

The cup container obtained as described above was cut, then the cross section was observed using a microscope to evaluate the continuity of the layer formed of the resin composition according to the embodiment of the present invention. Evaluation of "A (favorable)" was made in a case where the continuity of the resin composition layer was maintained, whereas evaluation of "B (unfavorable)" was made in a case where the continuity of the resin composition layer was lost.

Oxygen Transmission Rate (Oxygen Barrier Property)

The oxygen transmission rate was measured using an oxygen transmission rate test system ("MOCON OX-TRAN2/20" available from Modern Controls, Inc.). Specifically, the cup container was mounted on the test system, and the measurement was made at a temperature of 20° C. and a humidity of 65% RH (ASTM D3985). The oxygen barrier property was evaluated to be: "A (favorable)" in the case of the measurement value of less than 0.8 mL/(m$^2$·day·atm); and "B (unfavorable)" in the case of the measurement value of 0.8 mL/(m$^2$·day·atm) or greater.

Comparative Example 11

Using only the EVOH (A) pellets obtained in Example 1, a multilayer sheet was produced in a similar manner to Example 31 from the resin composition pellets, and the multilayer sheet was formed into a cup container in a similar manner to Example 34. The cup container was cut and the cross section was observed. Consequently, the continuity of the resin composition layer was absent in a corner portion of the container. Moreover, the oxygen transmission rate of the container was significantly increased, as compared with Example 34.

Comparative Example 12

Using only the EVOH (B) pellets obtained in Example 1, a multilayer sheet was produced in a similar manner to Example 31 from the resin composition pellets, and the multilayer sheet was formed into a cup container in a similar manner to Example 34. The cup container was cut and the cross section was observed. Consequently, the continuity of the resin composition layer was absent in a corner portion of the container. Moreover, the oxygen transmission rate of the container was significantly increased, as compared with Example 34.

Comparative Example 13

Using the EVOH (A) pellets obtained in Comparative Example 1, a multilayer sheet was produced in a similar manner to Example 31 from the resin composition pellets, and the multilayer sheet was formed into a cup container in a similar manner to Example 34. The cup container was cut and the cross section was observed. Consequently, the continuity of the resin composition layer was absent in a corner portion of the container. Moreover, the oxygen transmission rate of the container was significantly increased, as compared with Example 34.

Comparative Example 14

Using the EVOH (B) pellets obtained in Comparative Example 1, a multilayer sheet was produced in a similar manner to Example 31 from the resin composition pellets, and the multilayer sheet was formed into a cup container in a similar manner to Example 34. The cup container was cut and the cross section was observed. Consequently, the continuity of the resin composition layer was absent in a corner portion of the container. Moreover, the oxygen transmission rate of the container was significantly increased, as compared with Example 34.

Comparative Example 15

The EVOH (A) pellets obtained in Example 3 in an amount of 50% by mass and the EVOH (B) pellets obtained in Example 3 in an amount of 50% by mass were mixed. After dry-blending, the blend was subjected to extrusion and pelletization using a twin-screw extruder ("2D25W" available from Toyo Seiki Seisaku-sho, Ltd.; 25 mmφ, a die temperature of 220° C., screw rotation speed of 100 rpm) under a nitrogen atmosphere to obtain resin composition pellets. A multilayer sheet was produced in a similar manner to Example 31 from the resin composition pellets, and the multilayer sheet was further formed into a cup container in a similar manner to Example 34. The cup container was cut and the cross section was observed. Consequently, the continuity of the resin composition layer was found, but the oxygen barrier property of the cup container was significantly deteriorated as compared with Example 34.

Comparative Example 16

The EVOH (A) pellets obtained in Comparative Example 1 in an amount of 50% by mass and the EVOH (B) pellets obtained in Comparative Example 1 in an amount of 50% by mass were mixed. After dry-blending, the blend was subjected to extrusion and pelletization using a twin-screw extruder ("2D25W" available from Toyo Seiki Seisaku-sho, Ltd.; 25 mmφ, a die temperature of 220° C., screw rotation speed of 100 rpm) under a nitrogen atmosphere to obtain resin composition pellets. A multilayer sheet was produced in a similar manner to Example 31 from the resin composition pellets, and the multilayer sheet was further formed into a cup container in a similar manner to Example 34. The cup container was cut and the cross section was observed. Consequently, the continuity of the resin composition layer was found, but the oxygen barrier property of the cup container was significantly deteriorated as compared with Example 34.

Comparative Example 17

Using only the EVOH (A) pellets obtained in Example 16, a multilayer sheet was produced in a similar manner to Example 32 from the resin composition pellets, and the multilayer sheet was formed into a cup container in a similar manner to Example 36. The cup container was cut and the cross section was observed. Consequently, the continuity of the resin composition layer was absent in a corner portion of the container. Moreover, the oxygen transmission rate of the container was significantly increased as compared with Example 36.

Comparative Example 18

Using only the EVOH (B) pellets obtained in Example 16, a multilayer sheet was produced in a similar manner to Example 32 from the resin composition pellets, and the multilayer sheet was formed into a cup container in a similar manner to Example 36. The cup container was cut and the cross section was observed. Consequently, the continuity of the resin composition layer was absent in a corner portion of the container. Moreover, the oxygen transmission rate of the container was significantly increased as compared with Example 36.

Comparative Example 19

Using only the EVOH (A) pellets obtained in Comparative Example 5, a multilayer sheet was produced in a similar manner to Example 32 from the resin composition pellets, and the multilayer sheet was formed into a cup container in a similar manner to Example 36. The cup container was cut and the cross section was observed. Consequently, the continuity of the resin composition layer was absent in a corner portion of the container. Moreover, the oxygen transmission rate of the container was significantly increased as compared with Example 36.

Comparative Example 20

Using only the EVOH (B) pellets obtained in Comparative Example 5, a multilayer sheet was produced in a similar manner to Example 32 from the resin composition pellets, and the multilayer sheet was formed into a cup container in a similar manner to Example 36. The cup container was cut and the cross section was observed. Consequently, the continuity of the resin composition layer was absent in a corner portion of the container. Moreover, the oxygen transmission rate of the container was significantly increased as compared with Example 36.

Comparative Example 21

The EVOH (A) pellets obtained in Example 18 in an amount of 50% by mass and the EVOH (B) pellets obtained in Example 18 in an amount of 50% by mass were mixed. After dry-blending, the blend was subjected to extrusion and pelletization using a twin-screw extruder ("2D25W" available from Toyo Seiki Seisaku-sho, Ltd.; 25 mmφ, a die temperature of 220° C., screw rotation speed of 100 rpm)

under a nitrogen atmosphere to obtain resin composition pellets. A multilayer sheet was produced in a similar manner to Example 32 from the resin composition pellets, and the multilayer sheet was further formed into a cup container in a similar manner to Example 36. The cup container was cut and the cross section was observed. Consequently, the continuity of the resin composition layer was found, but the oxygen barrier property of the cup container was significantly deteriorated as compared with Example 36.

Comparative Example 22

The EVOH (A) pellets obtained in Comparative Example 5 in an amount of 50% by mass and the EVOH (B) pellets obtained in Comparative Example 5 in an amount of 50% by mass were mixed. After dry-blending, the blend was subjected to extrusion and pelletization using a twin-screw extruder ("2D25W" available from Toyo Seiki Seisaku-sho, Ltd.; 25 mmφ, a die temperature of 220° C., screw rotation speed of 100 rpm) under a nitrogen atmosphere to obtain resin composition pellets. A multilayer sheet was produced in a similar manner to Example 32 from the resin composition pellets, and the multilayer sheet was further formed into a cup container in a similar manner to Example 36. The cup container was cut and the cross section was observed. Consequently, the continuity of the resin composition layer was found, but the oxygen barrier property of the cup container was significantly deteriorated as compared with Example 36.

TABLE 3

|  | Continuity of resin composition layer | Oxygen barrier property |
|---|---|---|
| Example 34 | A | A |
| Comparative Example 11 | B | B |
| Comparative Example 12 | B | B |
| Comparative Example 13 | B | B |
| Comparative Example 14 | B | B |
| Comparative Example 15 | A | B |
| Comparative Example 16 | A | B |

TABLE 4

|  | Continuity of resin composition layer | Oxygen barrier property |
|---|---|---|
| Example 36 | A | A |
| Comparative Example 17 | B | B |
| Comparative Example 18 | B | B |
| Comparative Example 19 | B | B |
| Comparative Example 20 | B | B |
| Comparative Example 21 | A | B |
| Comparative Example 22 | A | B |

INDUSTRIAL APPLICABILITY

The resin composition according to the embodiment of the present invention exhibits inhibited flow marks, coloring and odor in a long-run operation, and is superior in heat stretching properties; therefore, the resin composition enables formed products exhibiting superior appearance characteristics and inhibited flow marks to be formed. The multilayer sheet according to the aforementioned embodiment of the present invention exhibits superior appearance characteristics and heat stretching properties. The packaging material according to the aforementioned embodiment of the present invention exhibits superior appearance characteristics and inhibited flow marks. The container according to the aforementioned embodiment of the present invention exhibits superior appearance characteristics and inhibited flow marks, and additionally in the container, the continuity of the resin composition layer is maintained, leading to superior gas barrier properties. Therefore, the resin composition, the multilayer sheet, the packaging material and the container can be suitably used as packaging materials and the like that are superior in appearance characteristics, suitability for secondary processing, mechanical strength and the like.

The invention claimed is:
1. A resin composition, comprising:
an ethylene-vinyl alcohol copolymer (A) having an ethylene content of 20 mol % or greater and 50 mol % or less;
an ethylene-vinyl alcohol copolymer (B) having an ethylene content of 30 mol % or greater and 60 mol % or less; and
a saturated carbonyl compound (C) having from 3 to 8 carbon atoms,
wherein:
the saturated carbonyl compound (C) is a saturated aldehyde (C-1), a saturated ketone (C-2) or a combination thereof,
a value obtained by subtracting the ethylene content of the ethylene-vinyl alcohol copolymer (A) from the ethylene content of the ethylene-vinyl alcohol copolymer (B) is 8 mol % or greater,
a mass ratio (A/B) of the ethylene-vinyl alcohol copolymer (A) to the ethylene-vinyl alcohol copolymer (B) is 60/40 or greater and 95/5 or less, and
a content of the saturated carbonyl compound (C) with respect to a resin content is 0.01 ppm or greater and less than 100 ppm.
2. The resin composition according to claim 1, wherein a difference between a melting point of the ethylene-vinyl alcohol copolymer (A) and a melting point of the ethylene-vinyl alcohol copolymer (B) is 15° C. or greater.
3. The resin composition according to claim 1, wherein:
the ethylene-vinyl alcohol copolymer (B) has a structural unit represented by formula (1):

wherein,

R$^1$, R$^2$, R$^3$ and R$^4$ each independently represent a hydrogen atom, a hydrocarbon group having from 1 to 10 carbon atoms or an alkoxy group having from 1 to 10 carbon atoms, wherein a part or all of hydrogen atoms in the hydrocarbon group are unsubstituted or substituted with a hydroxyl group, an alkoxy group, a carboxyl group or a halogen atom, R$^1$ and R$^2$ optionally represent a ring structure through binding with each other, and a percentage content of the structural unit with respect to the total vinyl alcohol units is 0.3 mol % or greater and 40 mol % or less.

4. The resin composition according to claim 1, wherein the saturated carbonyl compound (C) is the saturated aldehyde (C-1), and the saturated aldehyde (C-1) is propanal, butanal, hexanal or a combination thereof.

5. The resin composition according to claim 1, wherein the saturated carbonyl compound (C) is the saturated ketone (C-2), and the saturated ketone (C-2) is acetone, methyl ethyl ketone, 2-hexanone or a combination thereof.

6. A multilayer sheet, comprising:
    a barrier layer formed of the resin composition according to claim 1; and
    a thermoplastic resin layer laminated on at least one face of the barrier layer.

7. The multilayer sheet according to claim 6, wherein the barrier layer and the thermoplastic resin layer are laminated by a coextrusion molding process.

8. A packaging material, obtained by a process comprising subjecting the multilayer sheet according to claim 6 to a heat-stretching process.

9. A container, obtained by a process comprising subjecting the multilayer sheet according to claim 6 to a vacuum or pressure forming process.

* * * * *